US012130790B1

(12) United States Patent
Al-Qurishi et al.

(10) Patent No.: US 12,130,790 B1
(45) Date of Patent: Oct. 29, 2024

(54) METHOD FOR ACCELERATED LONG DOCUMENT SEARCH USING HILBERT CURVE MAPPING

(71) Applicant: ELM, Riyadh (SA)

(72) Inventors: Muhammad Saleh Saeed Al-Qurishi, Riyadh (SA); Riad Souissi, Riyadh (SA)

(73) Assignee: ELM, Riyadh (SA)

( * ) Notice: Subject to any disclaimer, the term of this patent is extended or adjusted under 35 U.S.C. 154(b) by 0 days.

(21) Appl. No.: 18/418,948

(22) Filed: Jan. 22, 2024

Related U.S. Application Data

(60) Provisional application No. 63/514,579, filed on Jul. 20, 2023.

(51) Int. Cl.
*G06F 16/22* (2019.01)
*G06F 16/93* (2019.01)
*G06F 16/953* (2019.01)

(52) U.S. Cl.
CPC ...... *G06F 16/2237* (2019.01); *G06F 16/2264* (2019.01); *G06F 16/93* (2019.01); *G06F 16/953* (2019.01)

(58) Field of Classification Search
CPC .... G06F 16/2237; G06F 16/93; G06F 16/953; G06F 16/2264
See application file for complete search history.

(56) References Cited

U.S. PATENT DOCUMENTS

| | | | | |
|---|---|---|---|---|
| 5,963,956 | A * | 10/1999 | Smartt | G06F 16/2264 707/999.102 |
| 6,460,034 | B1 * | 10/2002 | Wical | G06F 16/334 707/999.005 |
| 8,219,564 | B1 * | 7/2012 | Shao | G06F 16/901 707/743 |
| 9,183,203 | B1 * | 11/2015 | Tuchman | G06F 16/3347 |
| 9,336,192 | B1 * | 5/2016 | Barba | G06F 40/284 |
| 10,346,737 | B1 * | 7/2019 | Benitez | G06N 3/08 |

(Continued)

OTHER PUBLICATIONS

Ting Li, et al., "A locality-aware similar information searching scheme", International Journal on Digital Libraries, vol. 17, Oct. 12, 2014, pp. 79-93.

*Primary Examiner* — Mark E Hershley
(74) *Attorney, Agent, or Firm* — Oblon, McClelland, Maier & Neustadt, L.L.P.

(57) ABSTRACT

A system and method includes a textual document search engine. The method initializes the textual document search engine by inputting, into a memory, a very large number of documents, where each document has textual sentences, and each sentence of each document has m semantic embedding vectors. The method maps the m semantic embedding vectors to 1-dimensional vectors of Hilbert numbers using a Hilbert curve transformation, constructs an index table with the 1-dimensional vectors, and stores the index table in the memory. The index table is used for efficient search by inputting a full query document, which has embedding vectors corresponding to sentences in the query document, where the query embedding vectors are mapped into 1-dimensional vectors of Hilbert numbers using Hilbert curve transformation. The index table is searched using the Hilbert numbers and candidate documents are retrieved that are similar to the query document based on the Hilbert numbers.

15 Claims, 22 Drawing Sheets

(56) References Cited

U.S. PATENT DOCUMENTS

| | | | |
|---|---|---|---|
| 11,321,296 B1* | 5/2022 | Rivers | G06N 3/042 |
| 11,392,651 B1* | 7/2022 | McClusky | G06F 16/906 |
| 11,983,486 B1* | 5/2024 | Mariko | G06N 3/0475 |
| 12,008,026 B1* | 6/2024 | Sanz | G06F 16/3347 |
| 2003/0004938 A1* | 1/2003 | Lawder | G06F 16/2264 |
| 2004/0113953 A1* | 6/2004 | Newman | G06F 3/0483 |
| | | | 707/E17.012 |
| 2011/0035656 A1* | 2/2011 | King | H04N 1/00737 |
| | | | 715/234 |
| 2014/0095502 A1* | 4/2014 | Ziauddin | G06F 16/285 |
| | | | 707/E17.046 |
| 2014/0222826 A1* | 8/2014 | DaCosta | G06F 16/2228 |
| | | | 707/741 |
| 2017/0123382 A1* | 5/2017 | Ruzicka | G04R 20/00 |
| 2018/0004815 A1* | 1/2018 | Zhou | G06F 16/2462 |
| 2019/0065550 A1* | 2/2019 | Stankiewicz | G06F 16/248 |
| 2019/0102400 A1* | 4/2019 | Kumaran | G06F 16/355 |
| 2021/0056150 A1* | 2/2021 | Karandish | G06F 16/3329 |
| 2021/0090694 A1* | 3/2021 | Colley | G16H 15/00 |
| 2021/0150201 A1* | 5/2021 | Reisswig | G06T 7/70 |
| 2021/0158176 A1* | 5/2021 | Wan | G06F 18/22 |
| 2021/0202045 A1* | 7/2021 | Neumann | G06N 3/08 |
| 2021/0295822 A1* | 9/2021 | Tomkins | G06F 16/3323 |
| 2021/0312266 A1* | 10/2021 | Youn | G06F 9/4843 |
| 2022/0036209 A1* | 2/2022 | Horesh | G06N 3/088 |
| 2022/0198133 A1* | 6/2022 | Bar | G16H 15/00 |
| 2022/0222235 A1* | 7/2022 | Menghani | G06N 3/04 |
| 2022/0261430 A1* | 8/2022 | Kataoka | G06F 16/3347 |
| 2022/0261545 A1* | 8/2022 | Lauber | G06F 16/355 |
| 2023/0394235 A1* | 12/2023 | Rahman | G06F 40/242 |
| 2024/0176673 A1* | 5/2024 | Roseberg | G06F 9/5061 |

* cited by examiner

Algorithm 1: Building Index Table.

Input: Database $D$ of $n$ reference documents.

Output: Index table $\Psi$.

1: begin
2:     $\alpha \leftarrow +\infty$    // minimum value
3:     $\beta \leftarrow -\infty$    // maximum value
4:     $for\ i \leftarrow 0, 1, \ldots, n-1\ do$
5:     {
       $for\ j \leftarrow 0, 1, \ldots, |s_i| - 1\ do$
6:       If $(min(e_i^j) < \alpha))$
7:        $\alpha \leftarrow min(e_i^j)$
8:       If $(max(e_i^j) > \beta))$
9:        $\beta \leftarrow max(e_i^j)$
10:    }

FIG. 1A

```
11:  r ← 20    // number of bits to represent vector value
12:  m ← len(e₀⁰)   // number of dimensions
13:  Hilbert ← HilbertCurve (r, m)
14:  l ← 0    // Hilbert digit length
15:  ζ ← 0
16:  v ← len(round(|α| + β, 0))
17:  prec ← len(2ʳ − 1) − v − 1
18:  for i ← 0, 1, ..., n − 1 do
19:    {
20:      for j ← 0, 1, ..., |sᵢ| − 1 do
21:        for k ← 0, 1, ..., m − 1 do
22:          eᵢʲ[k] ← ⌊(eᵢʲ[k] + |α|) ∗ 10ᵖʳᵉᶜ⌋
23:          Hʋ ← Hilbert.distances_from_points(eᵢʲ)
24:          Ψ(ζ) ← (id = ζ, doc_no = i, Hilbert_no = Hʋ)
25:          ζ ← ζ + 1
26:          if (len(Hʋ) > l)
27:            l ← len(Hʋ)
28:    }
29:  for i ← 0, 1, ..., ζ − 1 do
30:    Ψ(i).Hʋ ← zfill(Ψ(i).Hʋ, l)
31:  sort(Ψ, key = Hʋ)
32:  return Ψ
33: end
```

FIG. 1B

Algorithm 2: Searching index table.

Input: $\Psi$: index table, $Q$: query document, $\alpha$, $prec$, $\tau$: cutoff of similar documents.
Output: $\phi$: list of similar documents for $Q$.

1: begin
2: $\quad s_q \leftarrow (e_q^0, e_q^1, ..., e_q^{|s_q|-1})$ // set of embedding vectors of $Q$.
3: $\quad \textit{for } i \leftarrow 0, 1, ..., |s_q| - 1 \textit{ do}$
4: $\quad\quad \textit{for } k \leftarrow 0, 1, ..., m - 1 \textit{ do}$
5: $\quad\quad\quad e_q^i[k] \leftarrow \lfloor (e_q^i[k] + |\alpha|) * 10^{prec} \rfloor$ //convert values into positive integers.
6: $\quad\quad H_i \leftarrow Hilbert.distances\_from\_points(e_q^i)$
7: $\quad\quad \rho \leftarrow binary\_search(\Psi, low = 0, high = \zeta, H_i)$
8: $\quad\quad T(i) \leftarrow \tau\_similar\_documents(\Psi, \zeta, \rho, \tau)$
9: $\quad\quad L \leftarrow T(i)$ //append elements of sub-list $T(i)$ to $L$ without duplication
10: $\quad \phi \leftarrow process\_candidates(L, T, \tau, s_{q'})$
11: end

FIG. 2

Algorithm 3: Binary search in the index table.

Input: $\Psi$: index table, low, high, $H_v$: key.
Output: $p$: index of the closest Hilbert number for the key $H_v$.

1: begin
2:   if(high ≥ low)
3:   {
4:     $m \leftarrow \lfloor(low + high)/2\rfloor$
5:     if ($\Psi[m].Hilbert\_no = H_v$)
6:       return $m$
7:     else if ($\Psi[m].Hilbert\_no > H_v$)
8:       return Algorithm 3($\Psi$, low, $m - 1$, $H_v$)
9:     else
10:       return Algorithm 3($\Psi$, $m + 1$, high, $H_v$)
11:   }
12:   else
13:     return low
14: end

FIG. 3

Algorithm 4: Retrieving candidate similar documents.

Input: $\Psi, \zeta, \rho, \tau$
Output: $\Gamma$: list of candidate similar documents 1: begin
2:   $k \leftarrow 0$
3:   $r \leftarrow \rho$
4:   while $((k < \tau) \text{ and } (r < \zeta))$
5:     if $(\Psi[r].doc\_no \notin \Gamma)$
6:       $append(\Gamma, \Psi[r].doc\_no)$
7:       $k \leftarrow k + 1$
8:     $r \leftarrow r + 1$
9:   $r \leftarrow \rho - 1$
10:   $k \leftarrow 0$
11:   while $((k < \tau) \text{ and } (r \geq 0))$
12:     if $(\Psi[r].doc\_no \notin \Gamma)$
13:       $append(\Gamma, \Psi[r].doc\_no)$
14:       $k \leftarrow k + 1$
15:     $r \leftarrow r - 1$
16: end

FIG. 4

Algorithm 5: Process candidate similar documents.

Input: $L$: one list of candidates, $T$: list of lists of candidates, $\tau$, $S_q$.
Output: $\phi$: $\tau$ similar documents.

1: begin
2:     $Y \leftarrow \{\}$    //list of couples $(doc\_no, freq)$
3:     $for\ i \leftarrow 0, 1, ..., |L| - 1\ do$
4:     $\{$
5:       $c \leftarrow 0$
6:       $for\ j \leftarrow 0, 1, ..., |T| - 1\ do$
7:       $\{$
8:         $if\ (L[i] \in T(i))$
9:         $c \leftarrow c + 1$
10:       $\}$
11:       $append(Y, (L[i], c))$
12:     $\}$
13:     $sort\_in\_decrease(Y, key = c)$
14:     $for\ k \leftarrow 0, 1, ..., \tau - 1\ do$
15:       $\phi[k] \leftarrow [Y[k].doc\_no, Eucledian\_Similarity(S_{Y[k].doc\_no}, S_q)]$
16:     $sort\_in\_decrease(\phi, key = similarity)$
17: end

FIG. 5

Figure 3: The elapsed time for indexing a database using Hilbert curve mapping with respective number of records.

Table 1. Original Embedding Vectors

| Document | 5-value embedding vector |
|---|---|
| Ref-D1 | [0.05899772, 2.6777743079, 0.608417751, -1.378104912, 0.215998452] |
| Ref-D1 | [0.127008112, 0.336111574, 0.596417219, 0.034775264, 0.196508737] |
| Ref-D2 | [0.218125316, 0.730643546, 0.701175148, 0.442649119, 0.353070667] |
| Ref-D2 | [0.357751115, 0.445425395, 0.280290961, 3.407773752, 0.291941145] |
| Ref-D2 | [0.746768992, -2.890565587, 0.431717718, 0.015134758, 0.742938751] |
| Ref-D3 | [0.73604619, 0.999766463, 0.41336097, 0.142131247, 0.049517799] |
| Ref-D3 | [0.854216032, 0.701527713, -3.003404283, 0.149892521, 0.836000447] |
| Ref-D4 | [0.530823734, 0.329296446, 0.56243139, 0.628313353, 0.341227239] |
| Ref-D4 | [-3.490145717, 0.870833281, 0.55636306, 0.45188087, 0.085737965] |
| Qry-D1 | [0.389511703, 2.706169447, 0.327143645, 0.840285792, 1.578026514] |
| Qry-D1 | [0.256207396, 0.480263522, 0.202687195, -2.767321979, 0.0078215552] |

FIG. 10

Table 2. Negative Values elliminated

| Document | 5-value embedding vector after adding 5.093494283 |
|---|---|
| Ref-D1 | [5.152492003, 7.771237362, 5.701912034, 3.715389371, 5.309492735] |
| Ref-D1 | [5.220502395, 5.429605857, 5.689911502, 5.128269547, 5.290003020] |
| Ref-D2 | [5.311619599, 5.824137829, 5.794669431, 5.536143402, 5.446564950] |
| Ref-D2 | [5.451245398, 5.538919678, 5.373785244, 8.901268038, 5.385435428] |
| Ref-D2 | [5.840263275, 2.202028696, 5.525211463, 5.108629041, 5.836433034] |
| Ref-D3 | [5.829540473, 6.093260746, 5.506855253, 5.235625530, 5.143012082] |
| Ref-D3 | [5.947710315, 5.795021996, 0.000000000, 5.243386804, 5.929494730] |
| Ref-D4 | [5.624318017, 5.422790729, 5.655925673, 5.721807636, 5.434721522] |
| Ref-D4 | [1.603348566, 5.964327564, 5.649857343, 5.545375153, 5.179232248] |
| Qry-D1 | [5.483005986, 7.799663730, 5.420637928, 5.933780075, 6.671520797] |
| Qry-D1 | [5.349701679, 5.573757805, 5.296181478, 2.326172304, 5.101315835] |

FIG. 12

Table 3: Embedding vectors after multiplication with 100.

| Document | 5-value embedding vector after converting to positive integers |
|---|---|
| Ref-D1 | [515, 777, 570, 372, 531] |
| Ref-D2 | [522, 543, 569, 513, 529] |
| | [531, 582, 579, 554, 545] |
| | [545, 554, 537, 850, 539] |
| Ref-D3 | [584, 220, 553, 511, 584] |
| | [583, 609, 551, 524, 514] |
| | [595, 580, 0, 524, 593] |
| Ref-D4 | [562, 542, 566, 572, 543] |
| | [160, 596, 565, 555, 518] |
| | [548, 780, 542, 593, 667] |
| Qry-D1 | [535, 557, 530, 233, 510] |

FIG. 13

Table 4: Hilbert curve distances

| Document | 1-value embedding vector after Hilbert curve transformation |
|---|---|
| Ref-D1 | 7873511263085587 |
|  | 7388728572455404 |
| Ref-D2 | 7388742337632953 |
|  | 7432028520350693 |
|  | 9012841489737963 |
| Ref-D3 | 7388770637537233 |
| Ref-D4 | 6333334871602523 |
|  | 7388724635021673 |
|  | 3523884354757223 |
| Qry-D1 | 7556174588615283 |
|  | 8126104037372793 |

FIG. 14

Table 5: Sorted strings with new numbers

| | |
|---|---|
| "352388435475722" | 300 |
| "633333487160252" | 600 |
| "738872463502167" | 700 |
| "738872857245504" | 940 |
| "738874233763295" | 1073 |
| "738877063753723" | 1273 |
| "743202852035069" | 1366 |
| "755617458861528" | 1459 |
| "787351126308587" | 1739 |
| "812610403737279" | 1839 |
| "901284148973796" | 1939 |

FIG. 17 the new numbers will be assigned to document sentences as in Table 6.

| Document | Our new numbering |
|---|---|
| Ref-D1 | 1739 |
|  | 940 |
| Ref-D2 | 1073 |
|  | 1366 |
|  | 1939 |
| Ref-D3 | 1273 |
| Ref-D4 | 600 |
|  | 700 |
|  | 300 |
| Qry-D1 | 1459 |
|  | 1839 |

FIG. 18

METHOD FOR ACCELERATED LONG DOCUMENT SEARCH USING HILBERT CURVE MAPPING

CROSS-REFERENCE TO RELATED APPLICATIONS

The present application claims the benefit of priority to U.S. Provisional Application No. 63/514,579 filed Jul. 20, 2023, the entire contents of which are incorporated herein by reference.

BACKGROUND

Technical Field

The present disclosure is directed to a method for searching and retrieving relevant documents in a large database efficiently and effectively, where the search query is an entire textual document. The method exploits the Hilbert curve to map multidimensional semantic embedding vectors into a one-dimensional vector, thereby reducing search time. The proposed method comprises four stages: mapping semantic embedding vectors from m-dimensions to 1-dimension, building an index table, searching the index, and performing a filtration stage. This invention enables faster retrieval of similar documents to a query document from a very large database by reducing the time complexity and computational overhead, while maintaining high-quality search results.

Description of Related Art

Searching more relevant documents for a query document in very large database of documents is a challenging problem due to the lack of quality and efficiency. To achieve the desired quality of search, the document must be matched semantically to ensure that the query and reference documents have similar meanings. Therefore, semantic embedding vectors for sentences must be considered in the matching process instead of an embedding vector for the entire document. However, sequential matching of longer embedding vectors consumes time, Hilbert curve is used to map multidimensional vector to a single dimensional vector which in turn accelerates the matching and searching process.

An object of the present disclosure is to provide a method and system for document searching that includes a pre-processing phase in which an index file is created for a very large database of documents. This index file consists of three attributes, embedding vector number, the number of documents that contain the embedding vector, and a Hilbert number that corresponds to the embedding vector. A further object is to provide an offline search phase in which a set of Hilbert numbers are generated for the set of embedding vectors included in a query document. A further object is to provide a method of performing a binary search for each Hilbert number in the index file.

SUMMARY

An aspect of the present disclosure is a method for a textual document search engine, that can include initializing the textual document search engine, by inputting, into a memory, a plurality of documents, wherein each document of the plurality of documents has a plurality of sentences, and each sentence of each document has m semantic embedding vectors, where m is an integer greater than 1; mapping, via a processing circuitry, the m semantic embedding vectors for each document of the plurality of documents to 1-dimensional vectors of Hilbert numbers using a Hilbert curve transformation; constructing, via the processing circuitry, an index table with the plurality of 1-dimensional vectors; and storing the index table in the memory.

A further aspect of the present disclosure is a method for searching a textual document database with an entire query document, that can include loading an index table into a memory, wherein the index table $\Psi=\{\zeta, \eta, H\nu_\zeta\}$ is a triple attribute table where $\zeta$ is an embedding vector number in respect to all embedding vectors of document D, $\eta$ is a document number that contains embedding vector $\zeta$, and $H\nu_\zeta$ is a Hilbert number that corresponds to a vector of number $\zeta$; inputting, into the memory, a query document, which has a plurality of embedding vectors corresponding to sentences in the query document, wherein the query embedding vectors are mapped into Hilbert numbers using Hilbert curve transformation; searching, via a processing circuitry, the index table using the Hilbert numbers and retrieving candidate documents that are similar to the query document based on the Hilbert numbers.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1A, 1B is an algorithm for creating an index table for searching query documents, in accordance with an exemplary aspect of the disclosure;

FIG. 2 is an algorithm for searching an index table, in accordance with an exemplary aspect of the disclosure;

FIG. 3 is an algorithm for binary search in the index table, in accordance with an exemplary aspect of the disclosure;

FIG. 4 is an algorithm for retrieving candidate similar documents, in accordance with an exemplary aspect of the disclosure;

FIG. 5 is an algorithm for processing candidate similar documents, in accordance with an exemplary aspect of the disclosure;

FIG. 10 illustrates an example of original embedding vectors for four reference documents and one query document, in accordance with an exemplary aspect of the disclosure;

FIG. 12 illustrates resulting negative values estimation, in accordance with an exemplary aspect of the disclosure;

FIG. 13 illustrates resulting embedding vectors after multiplication, in accordance with an exemplary aspect of the disclosure;

FIG. 14 illustrates resulting Hilbert curve distances, in accordance with an exemplary aspect of the disclosure;

FIG. 17 illustrates results of sorting strings with new numbers, in accordance with an exemplary aspect of the disclosure;

FIG. 18 is a step of assigning the new numbers to document sentences, in accordance with an exemplary aspect of the disclosure;

DETAILED DESCRIPTION

Figure 6:
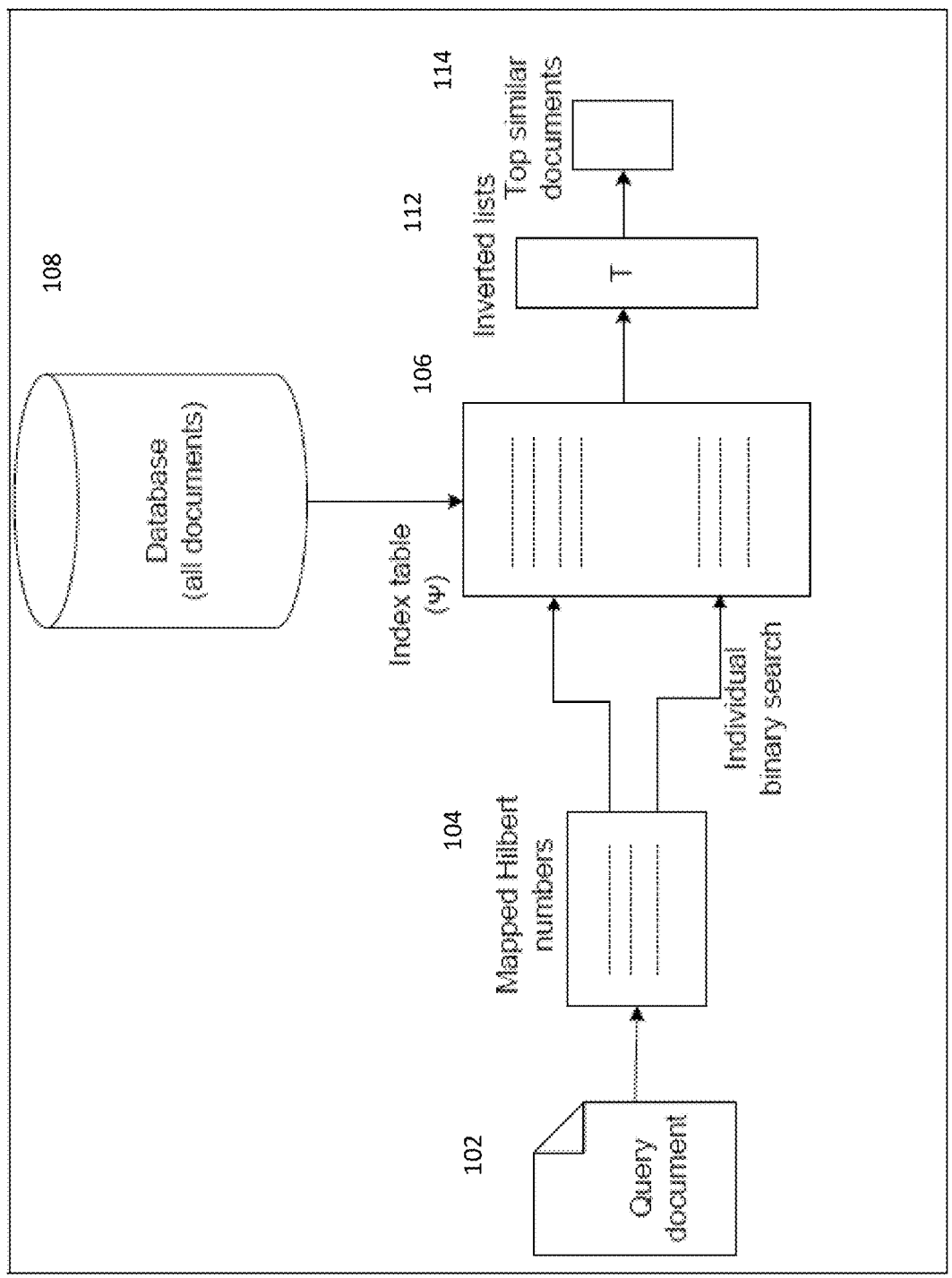
FIG. 6 illustrates a framework for searching similar documents in a very large database, in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

An aspect of the present disclosure is a method for efficiently and effectively searching and retrieving relevant documents in a large database. The method exploits the Hilbert curve to map multidimensional semantic embedding vectors into a one-dimensional vector. The method preferably includes four stages: mapping semantic embedding vectors from m-dimensions to 1-dimension, building an index table, searching the index, and performing a filtration stage. The method accomplishes faster retrieval of similar documents from a very large database by reducing the time complexity and computational overhead, while maintaining high-quality search results.

Algorithm Formulation

Let $D=\{d_1, d_2, \ldots, d_n\}$ be a set of n documents where each document $d_i=\{i, s_i\}$ has a number i and a set $s_i$ of semantic embedding vectors for all sentences in the document $d_i$. Let $s_i=\{e_i^1, e_i^2, \ldots, e_i^{|s_i|}\}$ be a set of embedding vectors of document $d_i$ and $|s_i|$ be its cardinality. The goal is to find the t best similar documents in D for a query document q.

For purposes of this disclosure, a large database of documents may include a number m of m documents is on the order of several thousand to several millions of documents, where each document, including a query document, can have a few hundred sentences to several thousand sentences. Documents can range from stand-alone documents, journal articles, conference papers, to entire books.

The method of the present disclosure exploits the Hilbert curve to map multidimensional semantic embedding vectors into a 1-dimensional vector to reduce the searching time. Each embedding vector must be converted into a Hilbert number and this number is used as a search key in the index file.

A Hilbert curve (also known as the Hilbert space-filling curve) is a continuous fractal space-filling curve. Because it is space-filling, its Hausdorff dimension is 2, precisely, its image is the unit square. The Hilbert number is a positive integer of the form 4n+1. The sequence of Hilbert numbers begins 1, 5, 9, 13, 17, and so on.

The index file $\Psi=\{\zeta, \eta, Hb_\zeta\}$ is a triple attribute table where $\zeta$ is the embedding vector number in respect to all vectors of D, n be the document number that contains embedding vector $\zeta$, and $Hb_\zeta$ be the Hilbert number corresponds vector of number $\zeta$. For a query document q, the set of embedding vectors are mapped into Hilbert numbers and the search is performed for each Hilbert number alone so that the corresponding document of the best match can be retrieved.

The method includes four stages: mapping semantic embedding vectors from n-dimensions to 1-dimension, building index table, searching in index, and a filtration stage. The different stages are elaborated below.

FIGS. 1A, 1B is Algorithm 1 for creating an index table for searching query documents, in accordance with an exemplary aspect of the disclosure.

FIG. 2 is Algorithm 2 for searching an index table, in accordance with an exemplary aspect of the disclosure.

FIG. 3 is Algorithm 3 for binary search in the index table, in accordance with an exemplary aspect of the disclosure.

FIG. 4 is Algorithm 4 for retrieving candidate similar documents, in accordance with an exemplary aspect of the disclosure.

FIG. 5 is Algorithm 5 for processing candidate similar documents, in accordance with an exemplary aspect of the disclosure.

Mapping m-D to 1-D

In the first stage, a Hilbert curve is used for mapping semantic embedding vectors from m-dimensions to 1-dimension. A Hilbert curve is a space filling curve which maps every m-dimensional point to 1-dimensional point. A feature of a Hilbert curve is that it preserves the spatial property. Using this property, the distances in the Hilbert curve are used for indexing the database so that similar documents can be retrieved for the query more efficiently.

To use a Hilbert curve for mapping m-dimensional point to 1-dimensional point, two parameters must be specified: the number of dimensions (m) and the number of bits for each coordinate value (p), where all values must be positive integer. For example, if the number of dimensions is 5 and the number of bits is 10, this means that the maximum coordinate value of embedding vectors is $2^{10}-1=1023$ and the maximum number on the Hilbert curve is $2^{50}-1$.

First the negative real embedding vector values must be converted into a positive integer. Two operations must be performed on the negative real values, shifting and scaling. All coordinate values are shifted relative to the absolute value of the global minimum coordinate value ($\alpha$) and then all coordinate values are converted to an integer by scaling and rounding (see FIG. 2, Algorithm 2). Every real number value in the embedding vectors must be converted into an integer. At first, there is a need to find the global minimum and maximum coordinate values, variables $\alpha$ and $\beta$, respectively (see FIG. 1, lines 2-3 in Algorithm 1). The value $|\alpha|$ must be added to all embedding vector values of the entire database. Thus, the minimum coordinate value will be 0 and the maximum coordinate value will be $|\alpha|+\beta$ so that all values are positive. By setting m=20, this means that the maximum integer coordinate value will be 1,048,575 which has 7 digits. Now, all coordinate values must have at most 6 digits. To do this step, the number of integer digits of $|\alpha|+\beta$ must be subtracted from 6. The remaining digits will be the necessary required order, prec (see FIG. 1, line 17 of Algorithm 1). Then, each coordinate value must scale $10^{prec}$ times and rounded to the right most integer digit.

Building Index

In this stage, the index table, $\Psi$, is created and sorted according to the string Hilbert numbers. It includes three attributes, id, doc_no, and Hilbert_no (see FIG. 1, line 24 of Algorithm 1). The index is preferably built once and afterward loaded to memory each time there is search for a new query document.

Performing a search using an index is more efficient than performing a direct search for a nearest similar document using the binary search algorithm. In either case, a binary search algorithm is much faster than a sequential search.

Since the query document has many embedding vectors, a list of candidate similar documents is created by searching for each embedding vector separately. The next subsection describes the searching process in detail.

Searching Process

FIG. 6 illustrates a framework for searching similar documents in a very large database 108.

Once the index table $\Psi$ 106 is loaded into memory and a new query document 102 is entered, in 104, query embedding vectors are mapped into Hilbert numbers (see FIG. 2, lines 2-6 of Algorithm 2). Next, in 106, a binary search is performed for each Hilbert number $H_{t_j}$ (see FIG. 2, called in line 7 of Algorithm 2, and described in FIG. 3, Algorithm 3) and, in 112, a list of candidate documents T (i) is created according to Algorithm 4. In the meantime, a common list $\hat{L}$ is constructed of unique document numbers in all sub-lists of T (see FIG. 2, line 9 of Algorithm 2). Finally, in 112, the candidate similar documents in T and $\hat{L}$ are processed according to Algorithm 5 (FIG. 5). In Algorithm 5, each document number in $\hat{L}$ is counted in all sub-lists of T. Then, these documents are sorted in a decreasing order where the top t documents are retrieved and reordered according to the average Euclidean similarity among all embedding vectors using a greedy matching. Greedy matching is type of matching where the search engine attempts to match as much text as possible.

Time and Space Complexity Analysis

The time complexity of Building index table $\Psi$ in Algorithm-1 can be analyzed as follows. Lines 4-10 consume time of O(ns), where n is the number of database documents and s is the average number of statements in each document, we assume that all documents of both database and query have the same number of statements. Lines 18-28 have time complexity of O(nsmr) where m is the size of embedding vectors and r is the number of bits to represent vector values. Lines 29-30 consume time complexity of O(ns). Line 31 represent the sorting of index file of size ns and it consumes O(ns log(ns)). Therefore, the total time complexity of building index table in Algorithm-1 is O(ns log(ns)+nsmr) while the space complexity of Algorithm-1 is O(ns), size of index table.

The time complexity of the searching process in Algorithm-2 can be summarized as follows. Lines 4-5 has time of O(m), line 6 (Hilbert mapping) has time complexity of O(mr), line 7 calls the binary search algorithm, Algorithm-3, which consumes O(log(ns)) time complexity, line 8 calls Algorithm-4 which retrieves t right nearest neighbor documents and T left nearest neighbor documents having similar Hilbert numbers for the current Hilbert number $H_{t_j}$ at position p of the index $\Psi$. Assuming that the statements of each document are contiguous in the index table, the time complexity of Algorithm-4 is $O(s\tau^2)$, line 9 which appends a list of at most 2 to another list $\hat{L}$ without duplication in time complexity of $O(s\tau^2)$. According to the for loop in line 3, lines 4-5 and lines 6-9 are repeated s times so that the total time complexity of lines 3-9 is $O(s\ (m+mr+log(ns)+s\tau^2+s\tau^2))$. Finally, line 10 calls Algorithm-5 to process the candidate documents by counting frequency of each document number in list L among sub-lists of list T and this process costs $O(s^2\tau^2)$. As a result, the overall time complexity of the searching process as described in Algorithm-2 is $O(smr+s\ log(ns)+s^2\tau^2)$. On the other hand, the space complexity of Algorithm-2 is $O(s\tau)$.

By analyzing the time complexity of building index table and searching for the input query document, the time of performing a searching process is very fast in contrast to the time to build the index table whereas the time of search is dependent heavily on the average number of statements in each document and the user cutoff variable t.

Experiments were conducted on a laptop Intel® Core™ i5-2410M CPU running at 2.3 GHz and 4 GB RAM. In the experiments, the scalability of proposed methods were evaluated on databases with different numbers of documents, 50-400, step 50. The elapsed time is reported in seconds for querying 20 documents (see Table 1) and the top 10 similar documents were retrieved.

As shown from Table 1, the brute force search method is the worst method for retrieving similar documents by measuring the Euclidean distance between embedding vectors. As listed in the table, the elapsed time is 2335 seconds for querying 20 documents in a database of 50 records (i.e., 117 seconds for querying a single record). The dashed line in Table 1 indicates that the elapsed time exceeds 3 hours which makes the method not scalable and thus useless with very large databases. In contrast, dimensionality reduction methods, random projection and statistical reduction, have more efficient running time while preserving the quality of results, and produce the same set of similar records. The Hilbert reduction method is more efficient than random projection and statistical reduction because the Hilbert curve mapping reduces the long embedding vector to a single value.

Figure 7:
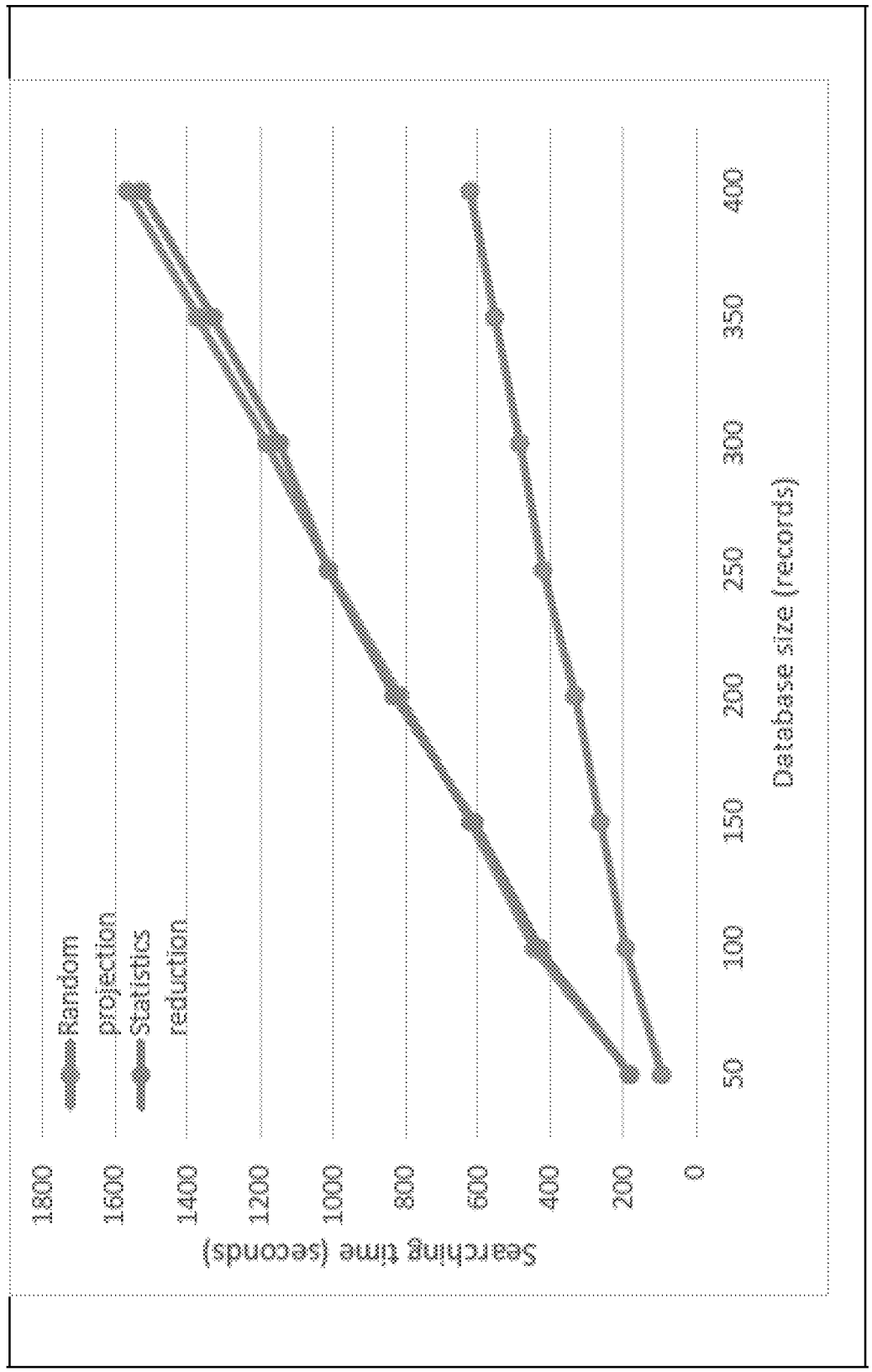
FIG. 7 is a graph of a comparison of running time between three fast search methods, in accordance with an exemplary aspect of the disclosure.

FIG. 7 shows the efficiency of Hilbert reduction compared to random projection and statistical reduction. The random projection and statistical reduction have similar efficiency while the Hilbert reduction method is faster than both methods.

From a theoretical point of view, a statistical reduction method is faster than random projection. To reduce n embedding vectors from length m to length k, the reduction process of random projection consumes time complexity of O(nmk) while statistical reduction has time complexity of 4 nm=O(nm).

In spite that the three document search methods, random projection, statistical reduction, and Hilbert reduction are fast, they perform the sequential search which is slower than binary search. With the low efficiency of sequential search, indexing the database is of interest especially with very large databases that prohibit internal search in RAM. Indexing a very large database enables fast access to similar records indirectly. In addition, binary search can be exploited to accelerate the matching process. As shown in Table 1, an indexing method using a Hilbert curve is used with two types of evaluations for candidate similar records, evaluated by frequency ranking and evaluated using Euclidean distance and greedy similarity matching. However, the Hilbert frequency ranking is much faster than the Hilbert similarity matching. The last search method is of higher quality in retrieving correct records in comparison with the naïve method.

TABLE 1 average elapsed time in seconds for querying 20 documents using different methods.

| | document search methods | | | | | |
|---|---|---|---|---|---|---|
| # of database documents | Naïve method | Random projection | Statistics reduction | Hilbert reduction | Hilbert-frequency indexing (search) | Hilbert-similarity indexing (search) |
| 50 | 2335.23 | 180.49 | 182.26 | 93.90 | 38.84 (0.08) | 38.19 (518.55) |
| 100 | 5518.09 | 445.11 | 428.88 | 192.45 | 79.26 (0.398) | 77.11 (431.27) |
| 150 | 8125.55 | 620.67 | 610.56 | 263.52 | 108.05 (0.443) | 106.75 (698.86) |
| 200 | — | 816.44 | 832.27 | 332.46 | 137.15 (0.336) | 134.58 (401.01) |
| 250 | — | 1011.88 | 1014.32 | 420.64 | 168.96 (0.311) | 160.06 (388.09) |
| 300 | — | 1182.32 | 1146.69 | 484.56 | 192.05 (0.281) | 188.47 (429.35) |
| 350 | — | 1372.55 | 1331.24 | 554.21 | 217.26 (0.371) | 219.54 (430.24) |
| 400 | — | 1566.06 | 1528.11 | 622.36 | 245.91 (0.333) | 245.13 (354.65) |

The indexing process is a point of interest to study the scalability on very large databases. Note that the indexing process for both methods, frequency and similarity, is the same and they differ in the evaluation process only. The indexing time is thus described for one method.

Figure 8:
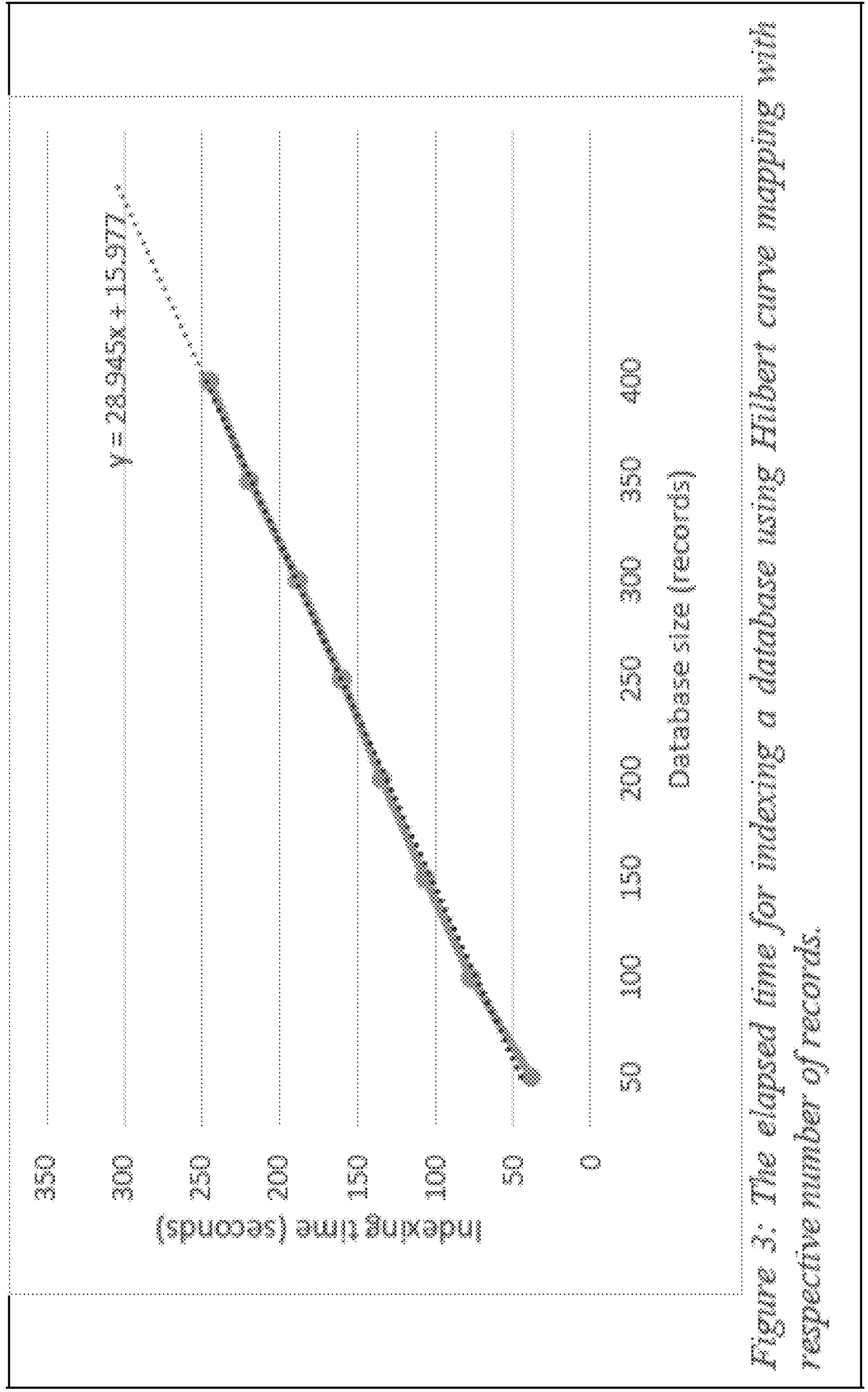
FIG. 8 is a graph of the elapsed time for indexing a database using Hilbert curve mapping with respective number of records, in accordance with an exemplary aspect of the disclosure.

As illustrated in FIG. 8, the curve of time indexing behaves linearly, and the trend line function is shown in the figure. Therefore, the time of indexing very large databases can be expected easily. To predict the required time to index a database of n records is computed as follows.

Indexing time in seconds=$28.945*(n/50)+15.977$ seconds

As a consequence, for databases of records 1000, 10000, 100000, and 1000000, the expected indexing times are 595, 5805, 57906, 578916 seconds, respectively.

As listed in Table 1, searching the index table of 400 records for 20 query documents and verifying candidate similar documents using frequency ranking consumes less than a second (0.333) while verifying candidate records with similarity ranking consumes 355 seconds (18 seconds for a single query record). For different sizes of a database, the searching time is steady in both evaluating methods which is a promising indicator for very large index tables.

Table 2 (confusion matrix) describes the primitive performance metrics, true positive (TP), true negative (TN), false positive (FP), and false negative (FN).

TABLE 2

Confusion matrix elementary metrics.

| | Prediction | |
|---|---|---|
| Actual | Negative | Positive |
| True | FN | TP |
| False | TN | FP |

The performance of the Hilbert reduction method is measured using Accuracy, Precision, Recall, and F1-score. Following are the equations of the 4 measures.

$$\text{Accuracy} = \frac{TP + TN}{TP + FP + TN + FN} \quad \text{Eq. (1)}$$

$$\text{Precision} = \frac{TP}{TP + FP} \quad \text{Eq. (2)}$$

-continued $$\text{Recall} = \frac{TP}{TP + FN} \quad \text{Eq. (3)}$$

$$F1\text{-score} = \frac{2(\text{Precision})(\text{Recall})}{\text{Precision} + \text{Recall}} = \frac{2TP}{2TP + FP + FN} \quad \text{Eq. (4)}$$

Table 3 (confusion matrix) shows the primitive performance metrics on top 25 similar records retrieved from a database of 100 records by the Hilbert reduction method when setting cutoff=50 compared with the ground truth, the naïve method.

TABLE 3

Confusion matrix for Hilbert reduction method.

| | Prediction | |
|---|---|---|
| Actual | Negative | Positive |
| True | 9 | 16 |
| False | 66 | 9 |

The confusion matrix for the performance of random projection method is shown in Table 4.

TABLE 4

Confusion matrix for random projection reduction method.

| | Prediction | |
|---|---|---|
| Actual | Negative | Positive |
| True | 4 | 21 |
| False | 71 | 4 |

The confusion matrix for the performance of statistical reduction method is shown in Table 5.

TABLE 5

Confusion matrix for statistical reduction method.

| Actual | Prediction | |
|---|---|---|
| | Negative | Positive |
| True | 5 | 20 |
| False | 70 | 5 |

The confusion matrix for the performance of Hilbert indexing with similarity method is shown in Table 6.

TABLE 6

Confusion matrix for Hilbert indexing method.

| Actual | Prediction | |
|---|---|---|
| | Negative | Positive |
| True | 6 | 19 |
| False | 69 | 6 |

The performance measures are listed in Table 7 for the best methods while neglecting the Hilbert indexing with frequency method due to the lack of performance.

The accuracy is computed for top 25 similar records when the cutoff=50. As seen from Table 7, Hilbert indexing-similarity method is competitive to random and statistical reduction in quality while in contrast it is more efficient. As listed in Table 1, with a database of 400 records, Hilbert-indexing-similarity method takes time of 600 seconds to build index table and search while random projection method takes 1566 seconds.

TABLE 7

Performance measures for the Hilbert reduction method for predicting 50 similar documents from a database of 100 records.

| Method | Accuracy | Precision | Recall | F1-score |
|---|---|---|---|---|
| Hilbert reduction | 82% | 64% | 64% | 64% |
| Random projection | 92% | 84% | 84% | 84% |
| Statistical reduction | 90% | 80% | 80% | 80% |
| Hilbert indexing-similarity | 88% | 76% | 76% | 76% |

The accuracy of Hilbert-indexing-similarity can be improved by increasing the cutoff. In an embodiment, the efficiency of this method can be enhanced by reducing the dimensions before mapping with Hilbert curve. That is because much time is consumed by Hilbert mapping function. Therefore, it is preferred to perform an appropriate reduction before mapping.

Example—Determining Semantic Similarity Based on Hilbert Curve Distances

Figure 9:
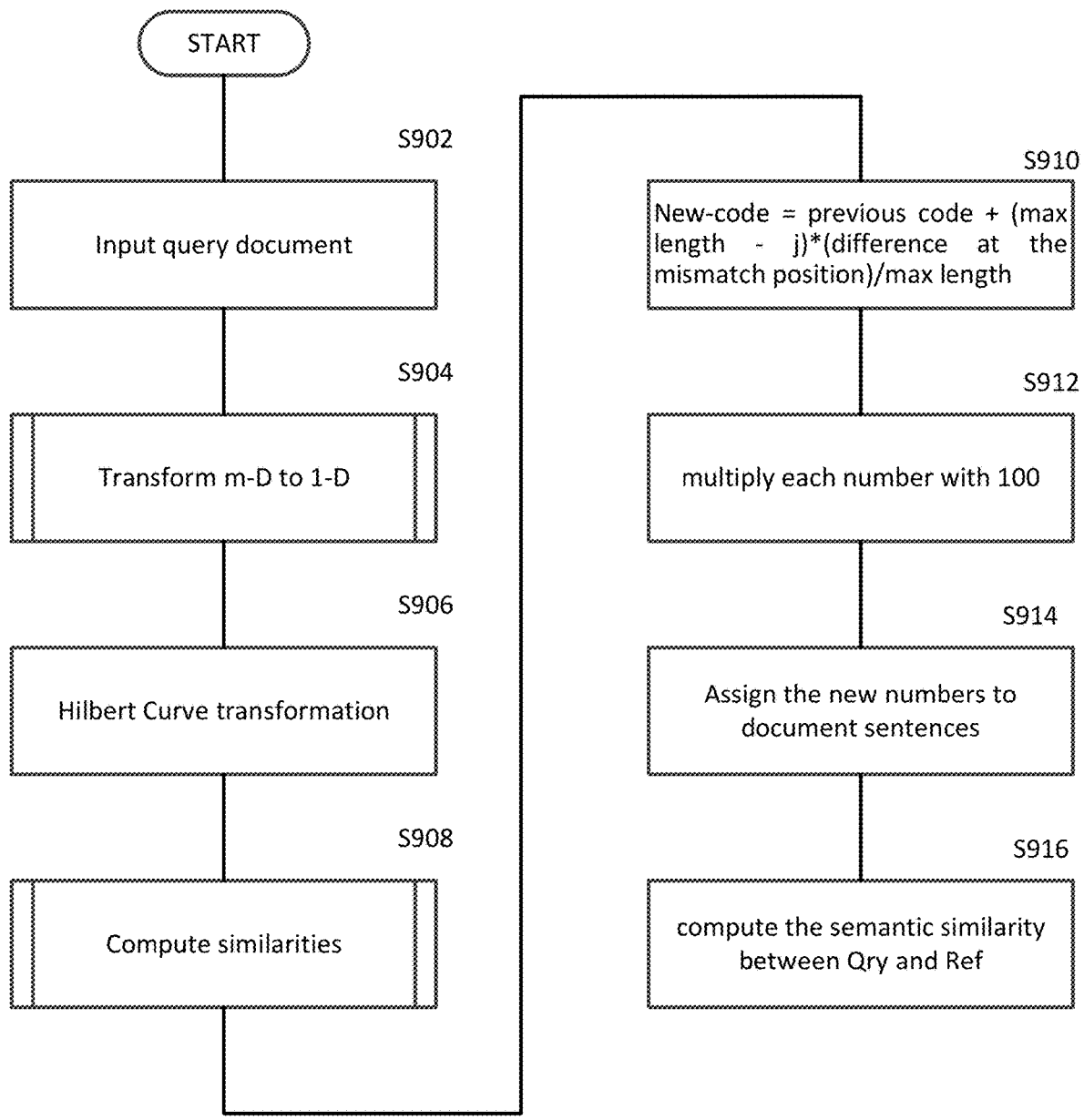
FIG. 9 is a flowchart for a method of determining the similar reference document to the query document.

FIG. 9 is a flowchart for a method of determining the similar reference document to the query document.

In S902, the method begins with four reference documents and one query document. An example of documents with its extracted embedding vectors is as shown in FIG. 10. The method may now identify the best reference document similar to the query document.

In S904, transform from an m-Dimensional vector to a 1-Dimensional vector.

Figure 11:
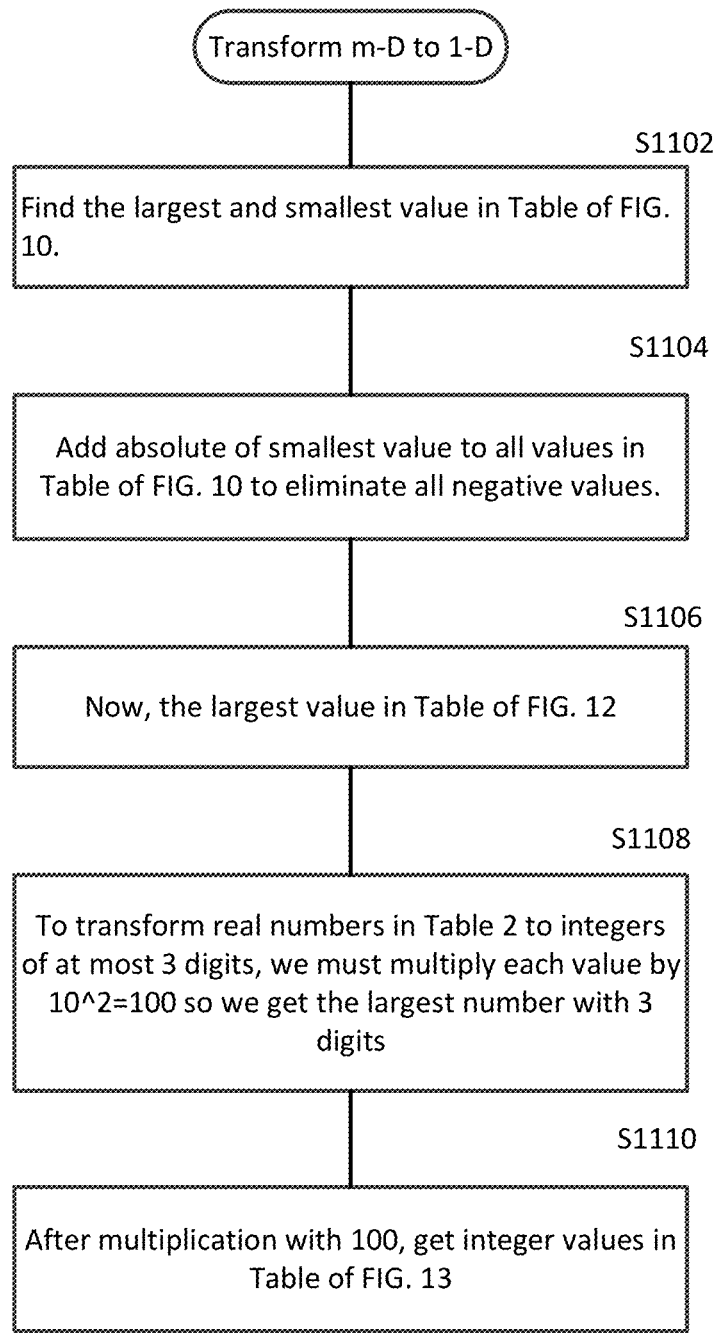
FIG. 11 is a flowchart for a process of transforming from m-D to 1-D, in accordance with an exemplary aspect of the disclosure.

In this example, regarding the flowchart in FIG. 11, the steps of a transformation from 5-D to 1-D, where the original number of embedding vectors is 5, are:

1. Since Hilbert curve distance imposes the condition that the vector values must be a positive integer, the method preprocess the embedding vector values as follows.
   a. In S1102, find the largest and smallest value in FIG. 10.=>largest value=3.407773752 and smallest value=−5.093494283
   b. In S1104, add absolute value of the smallest value to all values in FIG. 10 to eliminate all negative values. Add (5.093494283) as in FIG. 12.
   c. Now, in S1106, the largest value in FIG. 12 is (3.407773752+5.093494283)=8.501268035
   d. In S1108, to transform real numbers in FIG. 12 to integers of at most 3 digits, multiply each value by $10^2=100$ to get the largest number with 3 digits (850).
   e. In S1110, after multiplication with 100, get integer values in FIG. 13.
   f. The values in FIG. 13 are now ready to transform to Hilbert numbers with parameters (p=10, n=5)

In S906, a Hilbert curve transformation is performed to obtain a 1-value embedding vector, as the 1-Dimensional vector, as in FIG. 14.

Figure 15:
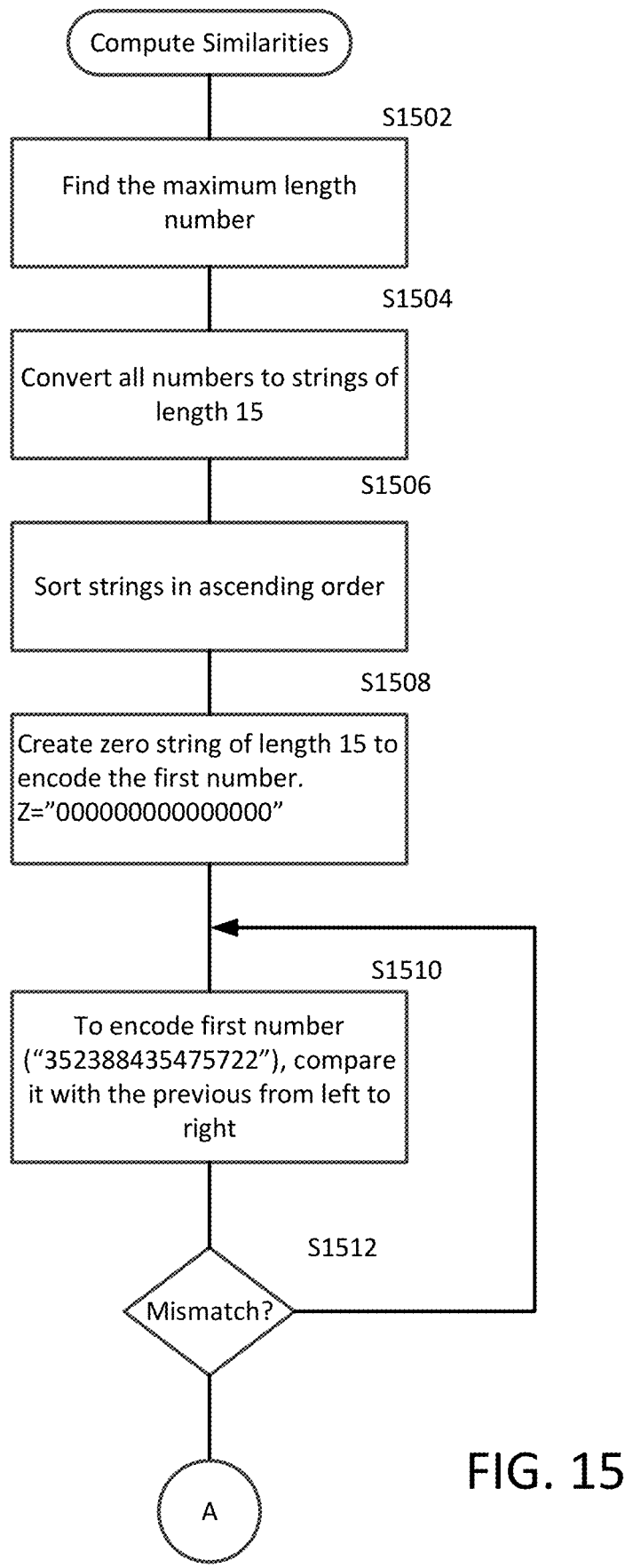
FIG. 15 is a flowchart for a process of computing similarities, in accordance with an exemplary aspect of the disclosure.

In S908, similarities are computed. FIG. 15 is a flowchart for computing similarities.

The problem now is how to process these big numbers? The method needs to find the difference between every two numbers to compute the similarity.

Figure 16A:
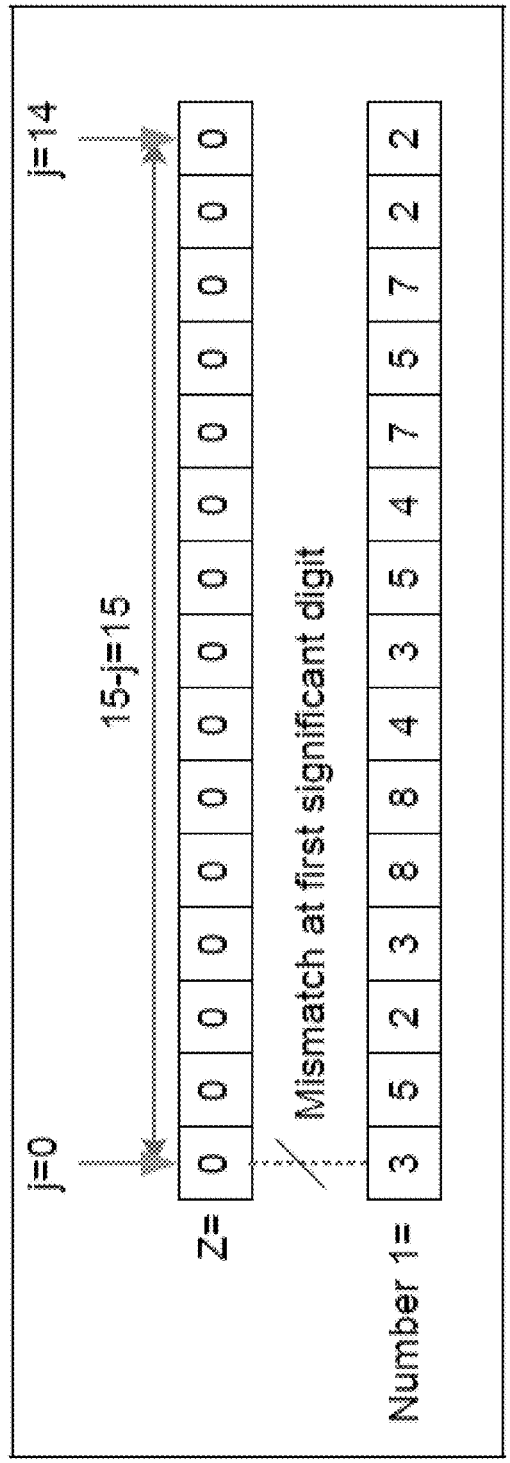
FIGS. 16A, 16B illustrates a step when a mismatch is encountered, in accordance with an exemplary aspect of the disclosure.
Figure 16B:
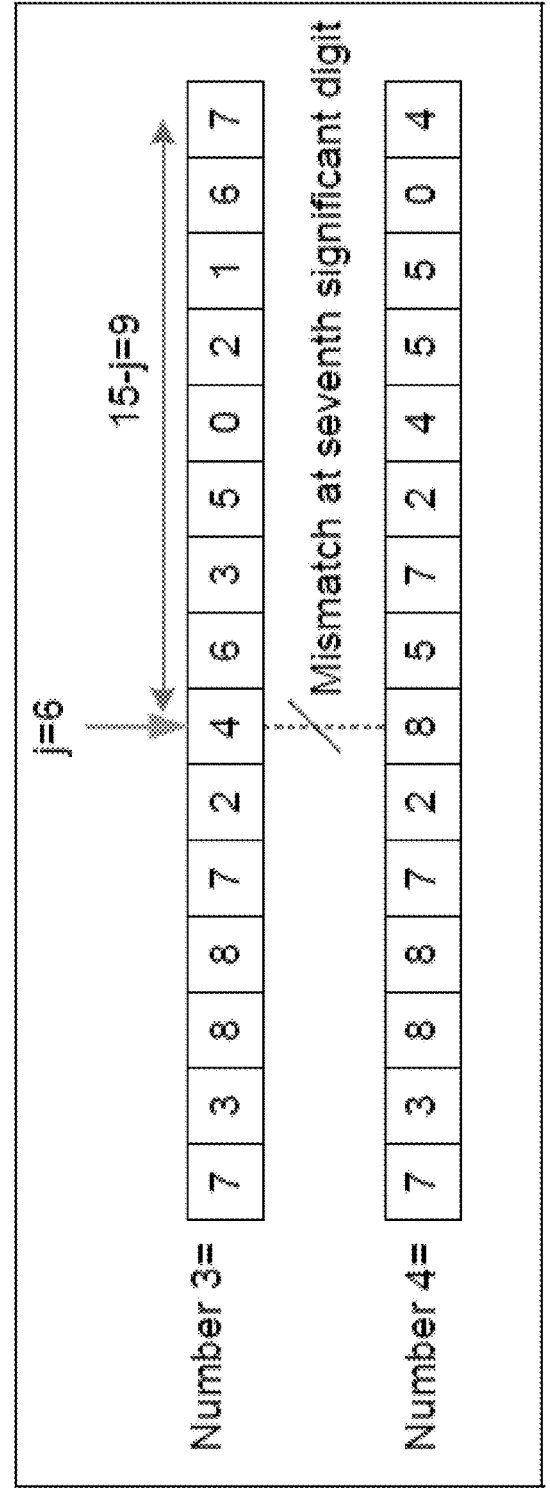

The method can be summarized by the following steps.
   a. In S1502, find the maximum length number. In this example, all numbers have the same length 15.
   b. In S1504, convert all numbers to strings of length 15. If there is a number of length less than 15 digits, say 11, we must add 4 zeros to the left of string. ("0000xxxxxxxxxxx")
   c. In S1506, sort strings in ascending order.
   d. In FIG. 16A, create zero string of length 15 to encode the first number. Z="000000000000000"
   e. FIG. 17 contains the sorted strings.
   f. Now, encode numbers.
   g. In FIG. 16A, to encode first number ("352388435475722"), we should compare it with the Z="000000000000000" from left to right. When the first mismatch is encountered, the code will be computed as in FIG. 16B.

Now, in S910, new-code=previous code+ (max length-j) *(difference at the mismatch position)/max length.

$$\text{Number } 1 = 0 + \frac{(15-0)(3-0)}{15} = 3$$

$$\text{Number } 2 = 3 + \frac{(15-0)(6-3)}{15} = 6$$

$$\text{Number } 3 = 6 + \frac{(15-0)(7-6)}{15} = 7$$

$$\text{Number } 4 = 7 + \frac{(15-6)(8-4)}{15} = 9.4$$

$$\text{Number } 5 = 9.4 + \frac{(15-5)(4-2)}{15} = 10.73$$

$$\text{Number } 6 = 10.73 + \frac{(15-5)(7-4)}{15} = 12.73$$

$$\text{Number } 7 = 12.73 + \frac{(15-1)(4-3)}{15} = 13.66$$

$$\text{Number } 8 = 13.66 + \frac{(15-1)(5-4)}{15} = 14.59$$

$$\text{Number } 9 = 14.59 + \frac{(15-1)(8-5)}{15} = 17.39$$

$$\text{Number } 10 = 17.39 + \frac{(15-0)(8-7)}{15} = 18.39$$

$$\text{Number } 11 = 18.39 + \frac{(15-0)(9-8)}{15} = 19.39$$

Now, in S912, it is enough to multiply each number with 100, as in FIG. 17.

Now, in S914, the new numbers will be assigned to document sentences as in FIG. 18.

Figure 19:
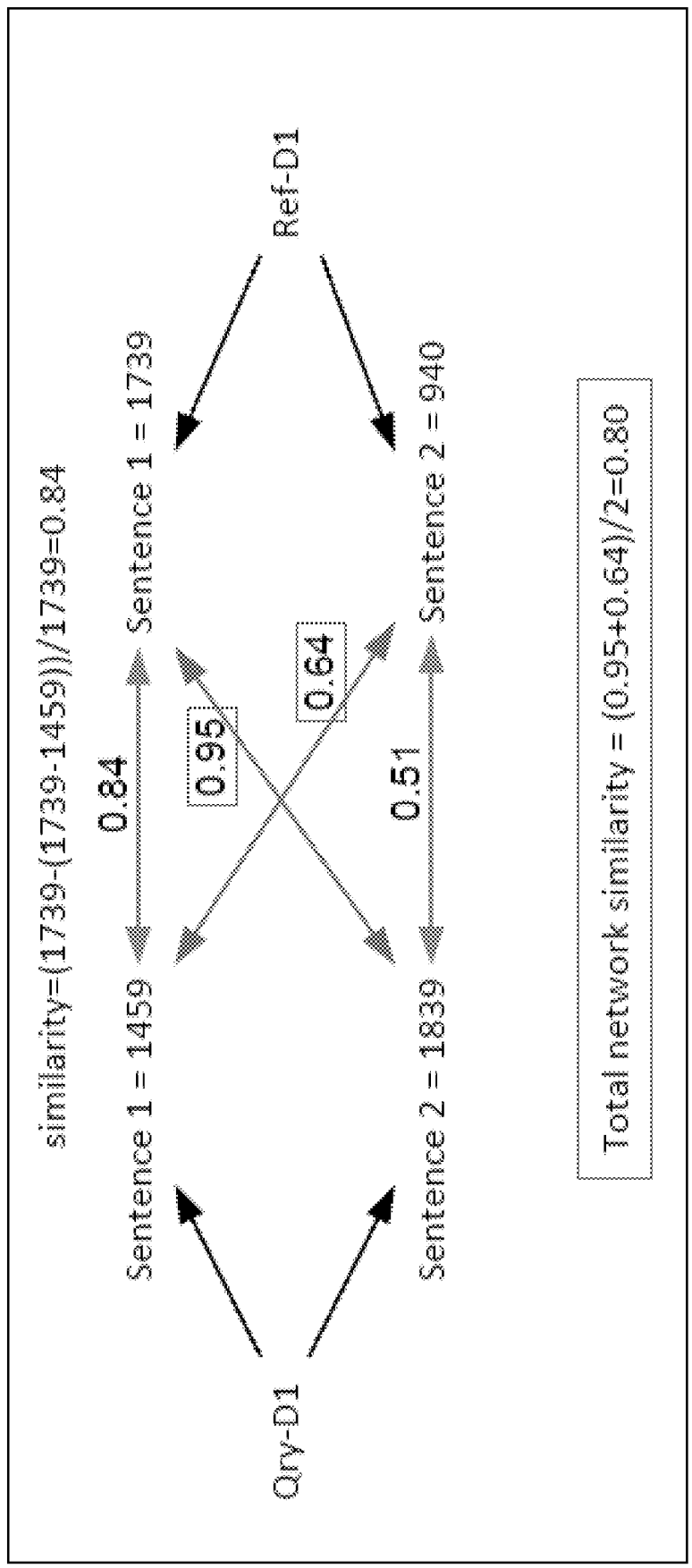
FIG. 19 illustrates a step of computing similarity.

To compute the semantic similarity between Qry-D1 and Ref-D1, in S916, compute the similarity as in FIG. 19.

Then similarity between Qry-D1 and Ref-D1=0.80.

Figure 20:
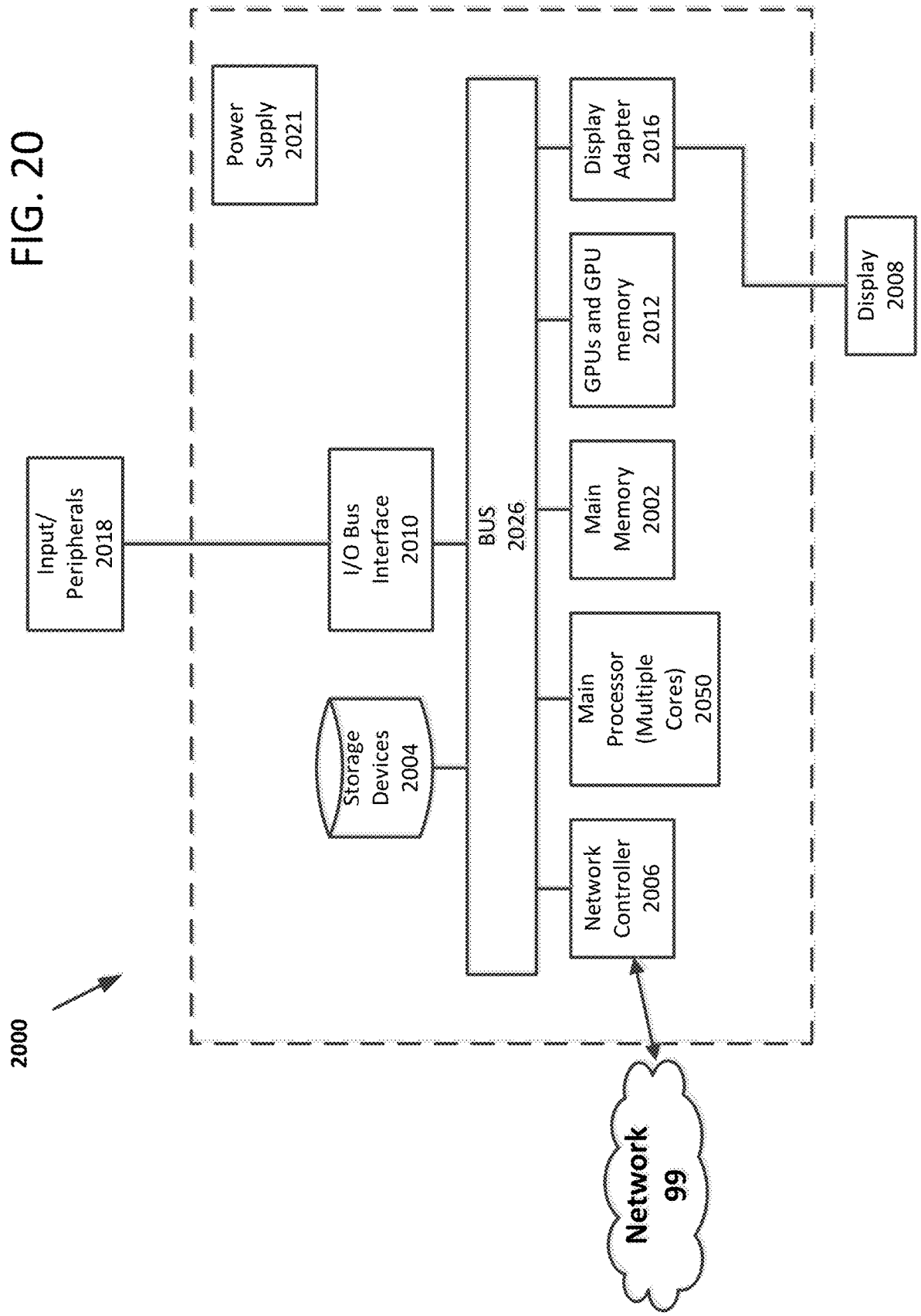
FIG. 20 is an illustration of a non-limiting example of details of computing hardware used in the computing system, according to aspects of the present disclosure.

FIG. 20 is an illustration of a non-limiting example of details of computing hardware used in the computing system, according to aspects of the present disclosure.

The computing hardware is for implementing the methods for semantic search according to an exemplary aspect of the disclosure. The methods for semantic search may be a software program executed on the computer system 2000. In some embodiments, the methods for semantic search may be a computer program stored on computer readable storage medium for execution on a computer system 2000. The computer readable storage medium may be any built-in storage medium (hard drive, solid state drive) or removable storage medium (DVD or the like). The computer system 2000 may be any general purpose computer, such as a laptop computer, desktop computer, or workstation, running an operating system, for example Ubuntu Linux OS, Windows, a version of Unix OS, or Mac OS. The computer system 2000 may include processing circuitry implementing one or more central processing units (CPU) 2050 having multiple cores. In some embodiments, the computer system 2000 may include a graphics board 2012 having multiple GPUs, each GPU having GPU memory. The graphics board 2012 may perform many of the mathematical operations of the disclosed machine learning methods. The computer system 2000 includes main memory 2002, typically random access memory RAM, which contains the software being executed by the processing cores 2050 and GPUs 2012, as well as a non-volatile storage device 2004 for storing data and the software programs. Several interfaces for interacting with the computer system 2000 may be provided, including an I/O Bus Interface 2010, Input/Peripherals 2018 such as a keyboard, touch pad, mouse, Display Adapter 2016 and one or more Displays 2008, and a Network Controller 2006 to enable wired or wireless communication through a network 99. The interfaces, memory and processors may communicate over the system bus 2026. The computer system 2000 includes a power supply 2021, which may be a redundant power supply.

Figure 21:
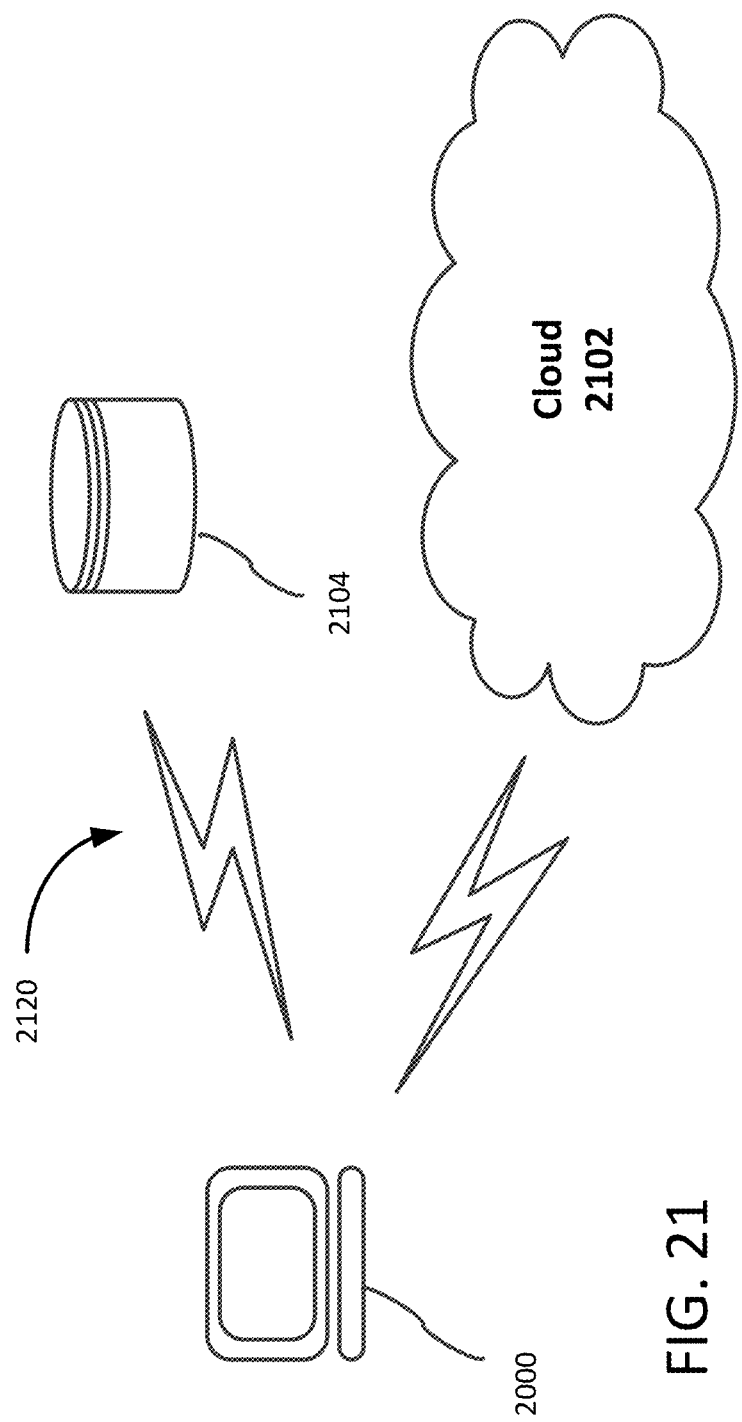
FIG. 21 is an illustration of a non-limiting example of distributed components that may share processing with the controller, according to aspects of the present disclosure.

FIG. 21 is an illustration of a non-limiting example of distributed components that may share processing with the controller. In some embodiments, the computer system 2000 may connect to a remote database 2104 or a database system implemented in a cloud service 2102. The remote database 2104 or cloud service 2102 contains a database of documents, and the computer system 2000 is configured to search the database of documents using the algorithms disclosed herein.

Numerous modifications and variations of the present invention are possible in light of the above teachings. It is therefore to be understood that within the scope of the appended claims, the invention may be practiced otherwise than as specifically described herein.

The invention claimed is:

1. A method for a textual document search engine, comprising:
   initializing the textual document search engine, by inputting, into a memory, a plurality of documents, wherein each document of the plurality of documents has a plurality of sentences, and each sentence of each document has m semantic embedding vectors, where m is an integer greater than 1;
   mapping, via a processing circuitry, the m semantic embedding vectors for each document of the plurality of documents to 1-dimensional vectors of Hilbert numbers using a Hilbert curve transformation;
   constructing, via the processing circuitry, an index table with the plurality of 1-dimensional vectors; and
   storing the index table in the memory,
   wherein, in the mapping, the processing circuitry performs the Hilbert curve transformation by converting m embedding vectors into a Hilbert number and the Hilbert numbers are search keys in the index table,
   the method further comprising:
   performing a search using the initialized textual document search engine, by
      receiving a query document, which has query embedding vectors;
      searching, via the processing circuitry, the search keys in the index table; and
      performing, via the processing circuitry, a filtration stage,
   wherein the searching, via the processing circuitry, includes:
      mapping the query embedding vectors into Hilbert numbers for the query document; and
      performing a binary search based on the Hilbert numbers, and
   wherein the performing the filtration stage, via the processing circuitry, includes:
      outputting a predetermined number of candidate documents that are similar to the query document.

2. The method of claim 1, wherein the index table $\Psi=\{\zeta,\eta,Hb_\zeta\}$ is a triple attribute table where $\zeta$ is an embedding vector number in respect to all of the embedding vectors of document D, $\eta$ is a document number that contains embedding vector $\zeta$, and $Hb_\zeta$ is the Hilbert number that corresponds to a vector of number $\zeta$.

3. The method of claim 2, wherein the constructing the index table, via the processing circuitry, includes
   creating the index table according to the Hilbert numbers; and
   sorting the Hilbert numbers.

4. The method of claim 1, further comprising:
   inputting, via the processing circuitry, a number of dimensions m and a number of bits for each coordinate value p, where all values are positive integers; and
   specifying, via the processing circuitry, the Hilbert curve based on the number of dimensions m and the number of bits for each coordinate value p.

5. The method of claim 3, further comprising:
   reducing, via the processing circuitry, the input number of dimensions m; and
   mapping, via the processing circuitry, the semantic embedding vectors from the reduced number of dimensions to the 1-dimension.

6. The method of claim 1, wherein the searching, via the processing circuitry, includes:
mapping the query embedding vectors into Hilbert numbers using Hilbert curve transformation;
assigning the Hilbert numbers to the sentences in the documents, including the query document; and
determining semantic similarity between the Hilbert numbers for the sentences in the query document and the sentences in each stored document, and
wherein the filtration stage includes outputting a predetermined number of candidate documents based on highest to lowest semantic similarity.

7. The method of claim 1, further comprising:
encoding, via the processing circuitry, the Hilbert numbers;
assigning, via the processing circuitry, the encoded Hilbert numbers to the sentences in the documents, including the query document; and
determining, via the processing circuitry, semantic similarity between encoded Hilbert numbers for the sentences in the query document and the sentences in each stored document.

8. A method for searching a textual document database with a query document, comprising:
loading an index table into a memory, wherein the index table $\Psi = \{\zeta, \eta, \mathbb{H}_\zeta\}$ is a triple attribute table where $\zeta$ is an embedding vector number in respect to all embedding vectors of document D, $\eta$ is a document number that contains embedding vector $\zeta$, and $\mathbb{H}_\zeta$ is a Hilbert number that corresponds to a vector of number $\zeta$;
inputting, into the memory, a query document, which has a plurality of embedding vectors corresponding to sentences in the query document, wherein the query embedding vectors are mapped into Hilbert numbers using Hilbert curve transformation;
searching, via a processing circuitry, the index table using the Hilbert numbers and retrieving candidate documents that are similar to the query document based on the Hilbert numbers;
inputting, into the memory, a plurality of documents, wherein each document of the plurality of documents has a plurality of sentences, and each sentence of each document has a plurality of semantic embedding vectors;
mapping, via the processing circuitry, the semantic embedding vectors from m-dimensions to 1-dimension vectors of Hilbert numbers using the Hilbert curve transformation;
constructing, via the processing circuitry, an index table with the 1-dimensional vectors;
storing the index table in the memory;
assigning, via the processing circuitry, the Hilbert numbers to sentences in the query document;
determining, via the processing circuitry, semantic similarity between the Hilbert numbers for the sentences in the query document and the sentences in each document; and
outputting, via the processing circuitry, a predetermined number of candidate documents based on highest to lowest semantic similarity.

9. The method of claim 8, further comprising:
performing, via the processing circuitry, a binary search based on the Hilbert numbers of the query document; and
outputting, via the processing circuitry, a predetermined number of candidate documents that are similar to the query document.

10. The method of claim 8, further comprising:
encoding, via the processing circuitry, the Hilbert numbers;
assigning, via the processing circuitry, the encoded Hilbert numbers to the sentences in the query document; and
determining, via the processing circuitry, semantic similarity between encoded Hilbert numbers for the sentences in the query document and the sentences in each stored document.

11. The method of claim 8, further comprising:
inputting, via the processing circuitry, a number of dimensions m and a number of bits for each coordinate value p, where all values are positive integers; and
specifying, via the processing circuitry, the Hilbert curve based on the number of dimensions m and the number of bits for each coordinate value p.

12. The method of claim 11, further comprising:
reducing, via the processing circuitry, the input number of dimensions m; and
mapping, via the processing circuitry, the semantic embedding vectors from the reduced number of dimensions to the 1-dimension.

13. The method of claim 8,
wherein the mapping, via the processing circuitry, the semantic embedding vectors further comprises
sorting, via the processing circuitry, the Hilbert numbers; and
encoding, via the processing circuitry, each sorted Hilbert number based on the sorted Hilbert numbers to obtain encoded numbers.

14. The method of claim 13, further comprising:
assigning, via the processing circuitry, the encoded numbers to the plurality of sentences in each of the documents.

15. The method of claim 14, further comprising:
determining, via the processing circuitry, semantic similarity between the sentences in the query document and each of the document sentences based on the encoded numbers.

* * * * *